US012276288B1

(12) United States Patent
Yu et al.

(10) Patent No.: US 12,276,288 B1

(45) Date of Patent: Apr. 15, 2025

(54) TWO-STAGE SPEED CONTROLLER

(71) Applicant: TAIWAN CHELIC CO., LTD., New Taipei (TW)

(72) Inventors: Ping-Cheng Yu, New Taipei (TW); Po-Hsun Yu, New Taipei (TW); Chih-Sheng Cheng, New Taipei (TW); Wei-Xiang Cheng, New Taipei (TW)

(73) Assignee: TAIWAN CHELIC CO., LTD., New Taipei (TW)

( * ) Notice: Subject to any disclaimer, the term of this patent is extended or adjusted under 35 U.S.C. 154(b) by 0 days.

(21) Appl. No.: 18/423,294

(22) Filed: Jan. 26, 2024

(30) Foreign Application Priority Data

Oct. 12, 2023 (TW) ................................ 112138998

(51) Int. Cl.

*F15B 11/04* (2006.01)
*F15B 11/042* (2006.01)
*F15B 11/044* (2006.01)
*F15B 11/048* (2006.01)
*F15B 11/06* (2006.01)
(Continued)

(52) U.S. Cl.

CPC ....... *F15B 11/0406* (2013.01); *F15B 11/0413* (2013.01); *F15B 11/042* (2013.01); *F15B 11/044* (2013.01); *F15B 11/048* (2013.01); *F15B 11/06* (2013.01); *F15B 13/042* (2013.01); *F15B 15/22* (2013.01); *F15B 2211/40515* (2013.01); *F15B 2211/40584* (2013.01); *F15B 2211/41527* (2013.01); *F15B 2211/41554* (2013.01); *F15B 2211/473* (2013.01); *F15B 2211/75* (2013.01); *F15B 2211/8855* (2013.01)

(58) Field of Classification Search

CPC ........ F15B 11/0406; F15B 2211/40584; F15B 2211/40515; F15B 2211/8855; F15B 2211/41527; F15B 11/0413

See application file for complete search history.

(56) References Cited

U.S. PATENT DOCUMENTS 5,097,747 A * 3/1992 Levenez ................ F15B 13/02 137/854
6,131,610 A * 10/2000 Morisako ................ F15B 13/01 137/601.19

(Continued)

FOREIGN PATENT DOCUMENTS

CN 217683376 U 10/2022
EP 1602834 A1 12/2005

*Primary Examiner* — Dustin T Nguyen
(74) *Attorney, Agent, or Firm* — Leong C. Lei

(57) ABSTRACT

A two-stage speed controller includes a main body including a first port and a second port in communication with each other, and a primary channel and a secondary channel for fluid to flow therethrough. The secondary channel allows flowing in a single direction to a pressure accumulation chamber. A sliding-axle seat is arranged in the second port. An end of a sliding axle assembly forms, together with the sliding-axle seat, a valve. The pressure accumulation chamber is connected with a primary throttle channel. The sliding axle assembly is formed, in a transverse direction, with a secondary throttle channel. During ingress and discharging of the fluid, all the channels and movement of the valve together allow for control of the pressure of the fluid according to a magnitude of a spring force of a regulation assembly in order to control a moving speed of a cylinder connected to the main body.

5 Claims, 12 Drawing Sheets

(51) Int. Cl.
*F15B 13/042* (2006.01)
*F15B 15/22* (2006.01)

(56) References Cited

U.S. PATENT DOCUMENTS

| | | | | |
|---|---|---|---|---|
| 6,293,180 | B1 | 9/2001 | Morisako et al. | |
| 6,296,015 | B1 | 10/2001 | Morisako et al. | |
| 6,554,017 | B2 * | 4/2003 | Berger | G05D 16/0663<br>137/505.11 |
| 6,745,789 | B2 | 6/2004 | Christiani et al. | |
| 9,115,811 | B2 * | 8/2015 | Yamada | F16K 31/50 |
| 9,664,302 | B2 * | 5/2017 | Fukushima | F16K 31/50 |
| 10,030,677 | B2 * | 7/2018 | Shishido | F15B 11/0413 |
| 10,514,048 | B2 * | 12/2019 | Yamada | F15B 13/042 |
| 10,627,007 | B2 * | 4/2020 | Suga | F15B 11/00 |
| 10,871,175 | B2 * | 12/2020 | Yamada | F15B 11/04 |
| 2017/0261008 | A1 | 9/2017 | Hama | |
| 2020/0003234 | A1 * | 1/2020 | Hama | F15B 11/0406 |

* cited by examiner

TWO-STAGE SPEED CONTROLLER

BACKGROUND OF THE INVENTION

(a) Technical Field of the Invention

The present invention provides a speed controller, and more particularly to a two-stage speed controller having an internal flow circuit and a structural arrangement such that a multiple-stage of speed control is available for an operation speed of a pneumatic cylinder, allowing control operation made with a regulation assembly to be conducted in a more intuitive manner.

(b) Description of the Prior Art

In automatized production operations, a pneumatic cylinder is a piece of commonly used equipment. However, it often takes an extended period of time for a pneumatic cylinder to move back and forth, and consequently, assisting products as are commercially available for designs and applications related to cushioning for pneumatic cylinders for the purposes of lowering the operation temperatures thereof caused by the operations and impact damages to structures having no cushioning.

For example, Taiwan Patent I783287 provides a time delay and flow controller, of which the disclosed contents as understood reveals a flow controller that is operable with a specific model of pneumatic cylinder in order to achieve a desired internal environment of the pneumatic cylinder and to achieve the best performance with specific parameters and in a specific environment, wherein through switching and guiding fluid, in combination with a corresponding compensation mechanism, the fluid is conducted to a corresponding flow path of the compensation mechanism for discharging by means of a needle valve, to thereby achieve the purposes of cushioning. However, it needs a significant amount of additional installation cost for realizing adjustment of the flow, and further, the design of the flow controller is complicated, making subsequent calibration sophisticated and inapplicable to arrangements of the same model, only workable for the pneumatic cylinder currently connected thereto. This makes constructing very difficult.

Further, Taiwan Patent I604132 provides a speed controller, of which the disclosed contents reveal that a number of flow paths are arranged in the interior of the structure of the speed controller for processing fluid in a sectionized manner and switching between high and low speeds being realized through discharging through a needle valve to thereby provide an excellent effect of cushioning. However, such a structure makes the interior thereof complicated and also significantly increase the entire size thereof.

SUMMARY OF THE INVENTION

The primary objective of the present invention is to provide a two-stage speed controller comprising a main body that is formed with a first port and a second port for a fluid to flow therethrough, the main body being provided, in an interior thereof, with a sliding axle assembly and a regulation assembly, and a plurality of channels (a primary channel, a secondary channel, a balance channel, a primary throttle channel, and a secondary throttle channel), the secondary channel allowing flowing in a single direction to a pressure accumulation chamber, the sliding axle assembly comprising a main axle having an end sequentially extending through an elastic element and a sub-axle to subsequently fit to an internal wall of the main body, the main axle and the sub-axle defining therebetween a balance channel, the main axle having an opposite end to which a regulation assembly comprising a knob connecting member connecting a rotary regulation knob is mounted, the second port receiving a sliding-axle seat arranged therein, the sub-axle forming, in combination with the sliding-axle seat, a valve;

characterized in that the pressure accumulation chamber is connected with and in communication with the primary throttle channel, and the sub-axle is formed with a secondary throttle channel arranged in a transverse direction thereof, wherein when the fluid flows through the first port, with the valve being in a closed condition, the fluid is allowed to flow to outside by means of the primary channel, the balance channel, the secondary channel, the primary throttle channel, and the secondary throttle channel, and in combination with the second port, driving the sliding axle assembly to start to move upwards to open the valve, and when the fluid is kept continuously circulating and flowing through the valve in combination with the secondary throttle channel, the sliding axle assembly is kept upward opening the valve to allow a cylinder connected to the main body to advance in two stages of speeds of initial acceleration and high speed; in a returning stroke of the cylinder where the valve carries out fast discharging from an open condition, the fluid flows, through a combination of all the channels, to the first port to allow the sliding axle assembly to gradually move downward to close the valve, together with the primary throttle channel and the secondary throttle channel, to allow the sliding axle assembly moving downward to fully close the valve to be adjusted to perform at a slow speed, allowing for cushioning to an impact of the cylinder in a returning stroke and to prevent the temperature of the cylinder from significantly arising.

A first secondary objective of the present invention is that when the regulation assembly is in a fast discharging state for the main body, the rotary regulation knob in combination with the knob connecting member allows a spring force of the elastic element to adjust positional constraint to the sliding axle assembly for closing the valve so as to allow for adjusting of an internal cushioning position of the cylinder connected to the main body.

A second secondary objective of the present invention is that the primary throttle channel is further provided, in an interior thereof, with a throttle cylinder, and a cross-sectional area of the primary throttle channel minus a cross-sectional area of the cylindrical throttle pin is between 1% to 7% of an area of the primary throttle channel, so that different cross-sectional areas of the throttle cylinder influence the pressure drop of the pressure accumulation chamber for closing the valve to thereby influence a cushioning position of the cylinder.

A third secondary objective of the present invention is that a ratio of an area of the valve relative to an area of the balance channel is between 1:1 to 1:4 to prevent the sliding axle assembly from being pushed backward to cause opening of the valve (50).

A fourth secondary objective of the present invention is that a diameter of the secondary throttle channel is between 0.2 to 0.4 millimeters, so that different diameters are applicable to allow a channel discharging amount to induce a slow-speed motion for cylinder discharging.

As such, primarily, the complicated structure of the commercially available related products can be simplified, and the spring force can be adjusted intuitively to achieve, in combination with the inside pressure of the pressure accumulation chamber, the purposes of controlling and also to greatly reduce the conditions of constraining for arrangement and being applicable to cylinders of various producers.

DETAILED DESCRIPTION OF THE PREFERRED EMBODIMENTS

Figure 1:
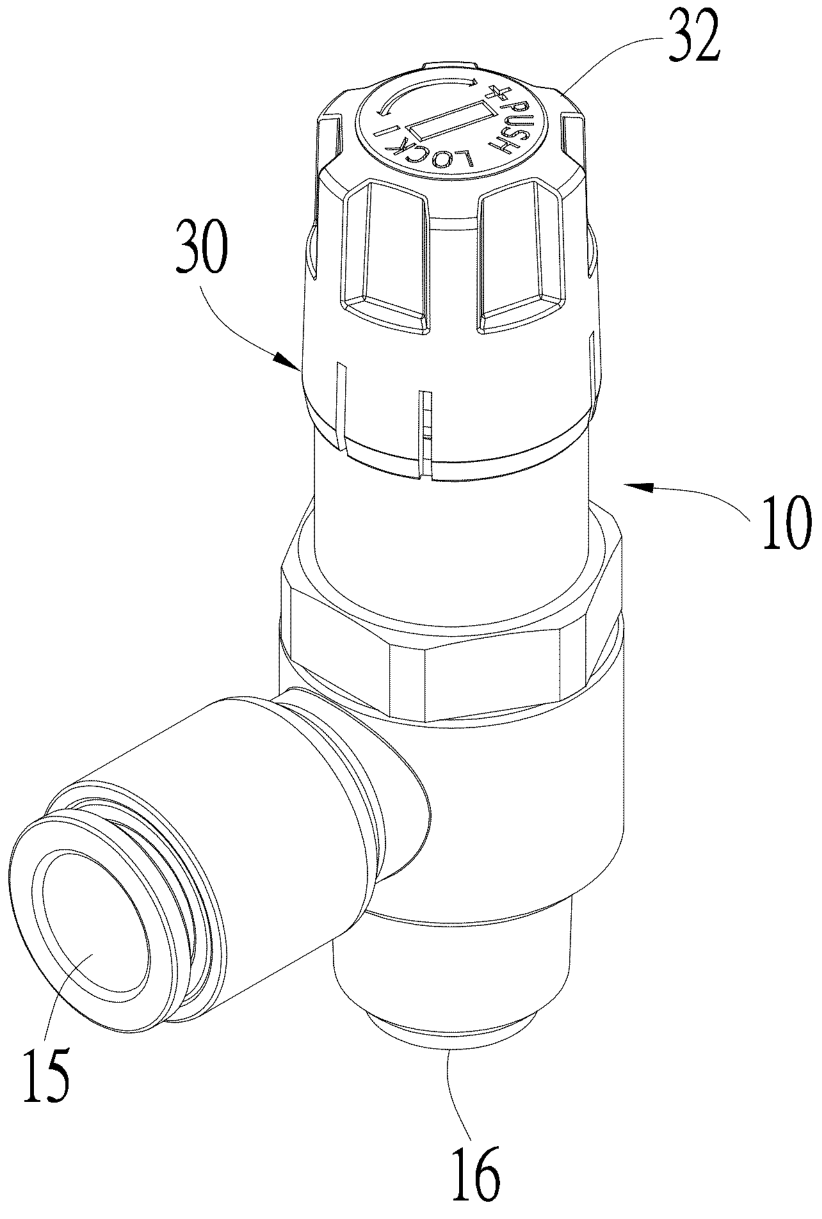
FIG. 1 is a perspective view of the present invention.
Figure 2:
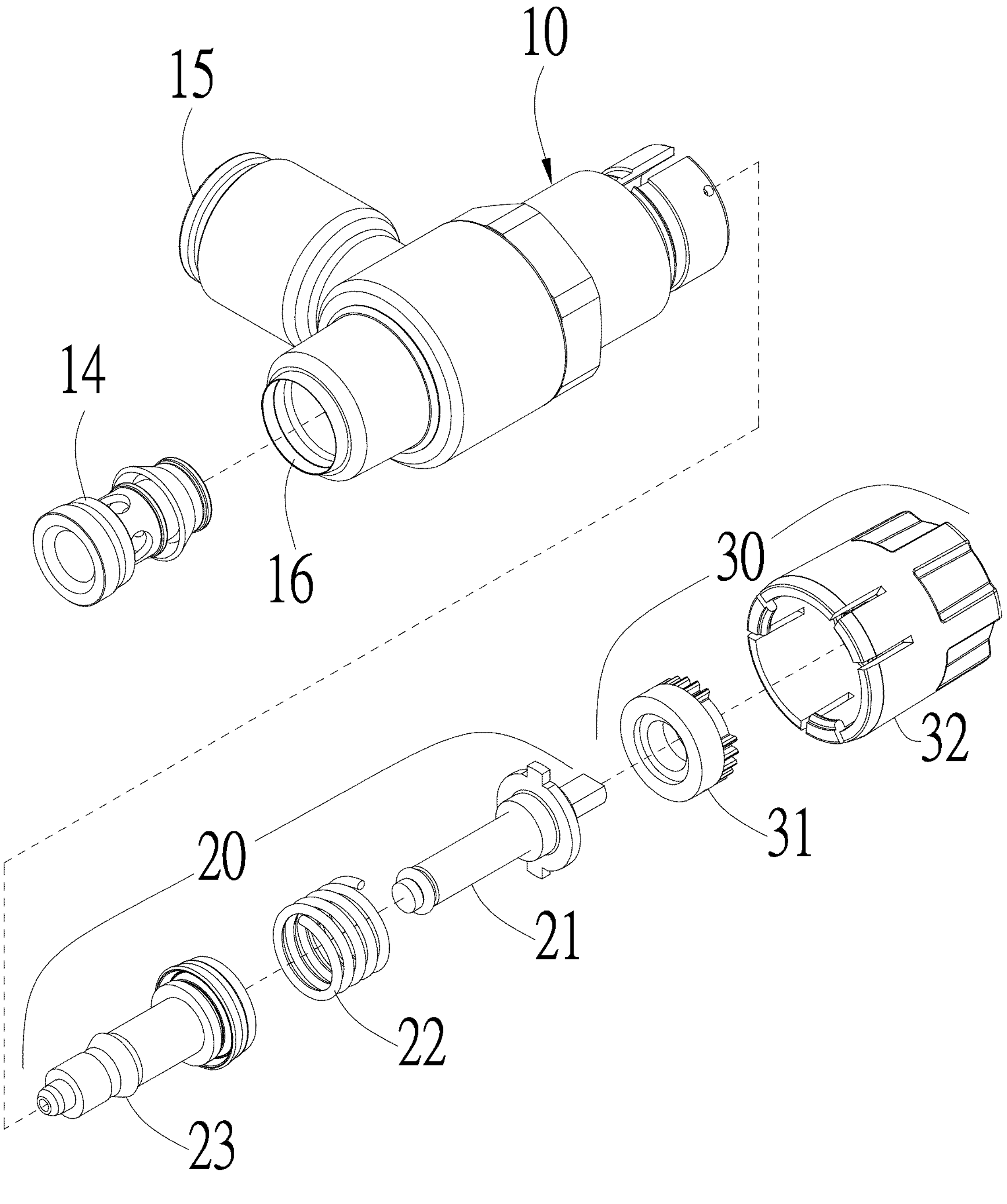
FIG. 2 is an assembling diagram of the present invention.
Figure 3:
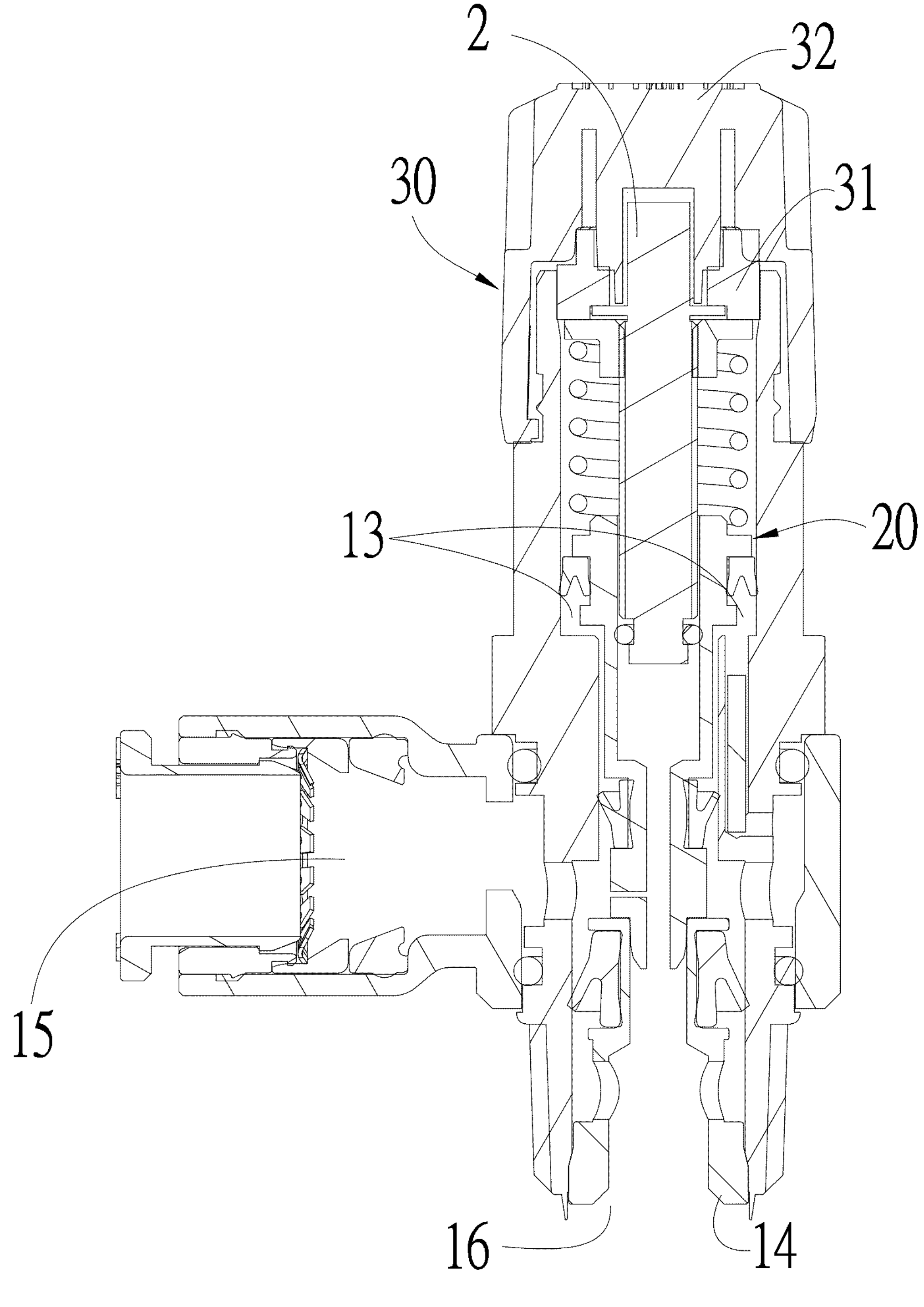
FIG. 3 is a schematic view showing a standby state of a main body of the present invention.
Figure 4:
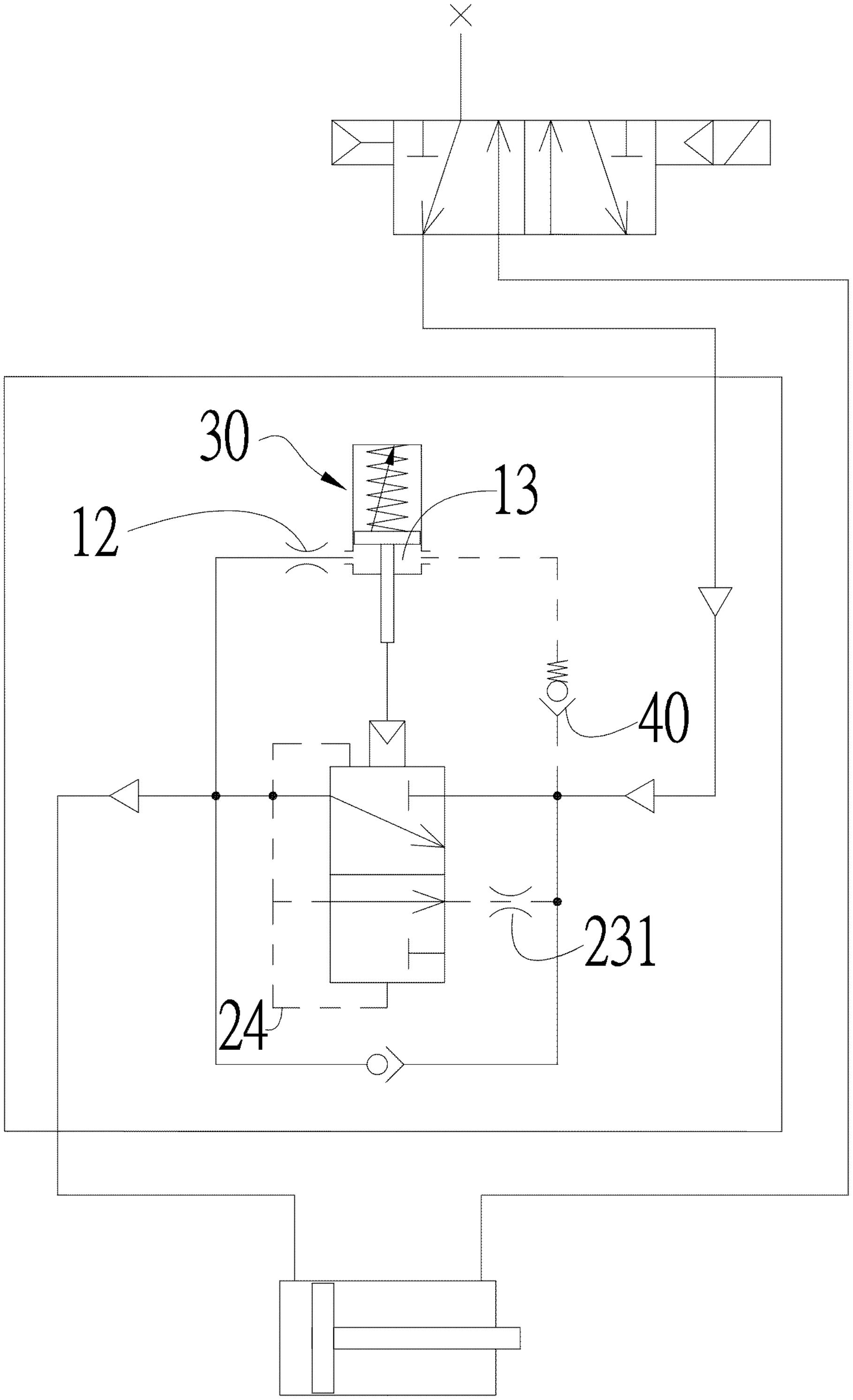
FIG. 4 is a control circuit diagram of the present invention based on FIG. 3.

Commonly according to a best feasible embodiment of the present invention, with reference to FIGS. 1-4, a detailed description is made below for better understanding of the present invention. The present invention relates to a two-stage speed controller, which comprises: a main body (10), which is formed with a first port (15) and a second port (16) in communication with each other to allow fluid (A) to flow to a primary channel (11) and a secondary channel (40), wherein the secondary channel (40) allows only flowing in a single direction to a pressure accumulation chamber (13), and the primary channel (11) allows flowing from the first port (15) and the second port (16) into the main body (10), and the second port (16) receives a sliding-axle seat (14) to fit therein; and a sliding axle assembly (20), which comprises: a main axle (21) having an end penetrating sequentially through an elastic element (22) and a sub-axle (23) to subsequently fit into an internal wall of the main body (10), wherein the main axle (21) and the sub-axle (23) define a balance channel (24) therebetween, and the main axle (21) has an opposite end on which a regulation assembly (30) is mounted, wherein the regulation assembly (30) comprises a knob connecting member (31) connecting a rotary regulation knob (32), and one end of the sliding axle assembly (20) forms, in combination with the sliding-axle seat (14), a valve (50).

Figure 5:
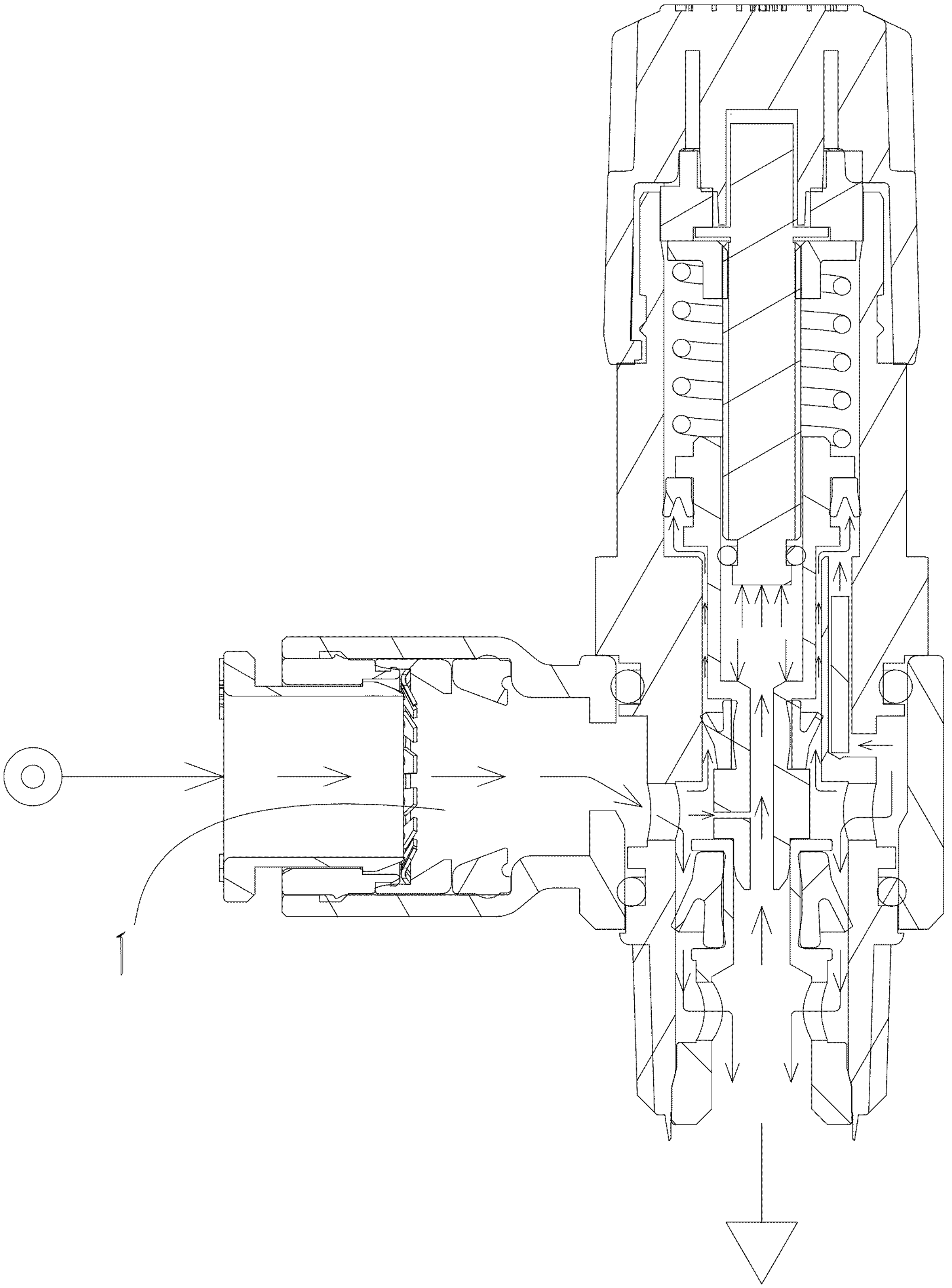
FIG. 5 is a schematic view showing an ingress and initial acceleration state of the main body of the present invention.
Figure 6:
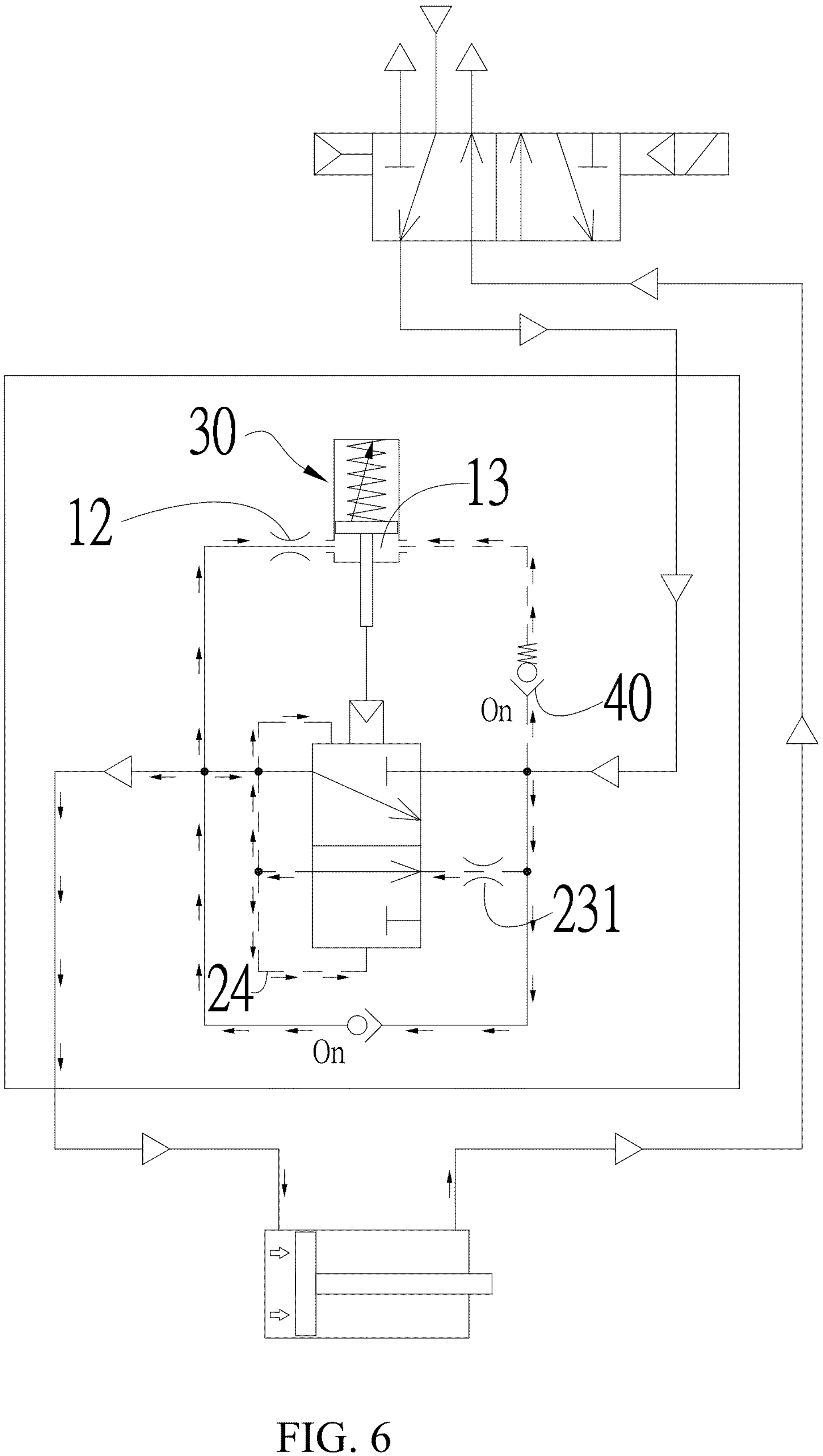
FIG. 6 is a control circuit diagram of the present invention based on FIG. 5.
Figure 7:
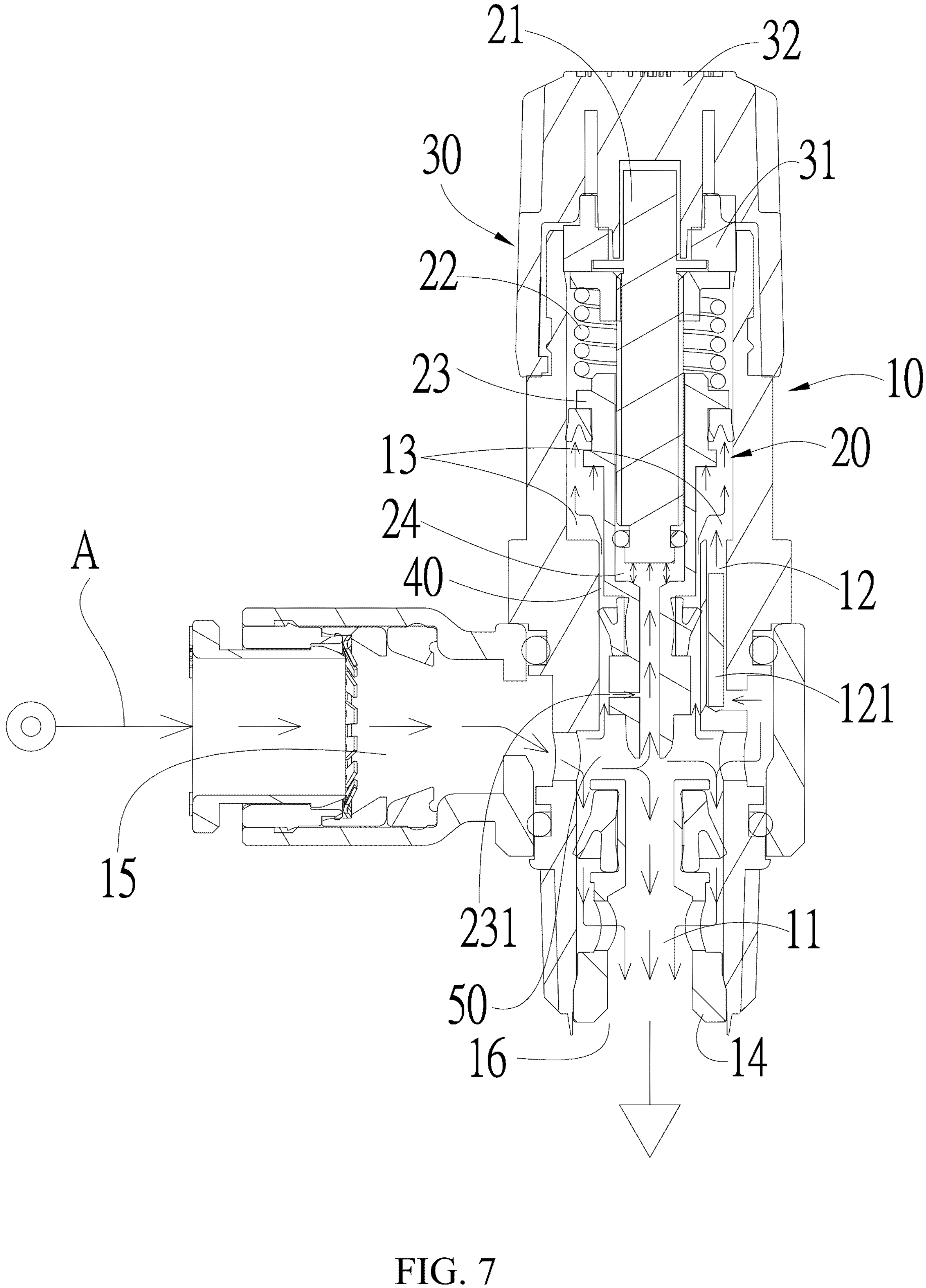
FIG. 7 is a schematic view showing an ingress and high speed state of the main body of the present invention.
Figure 8:
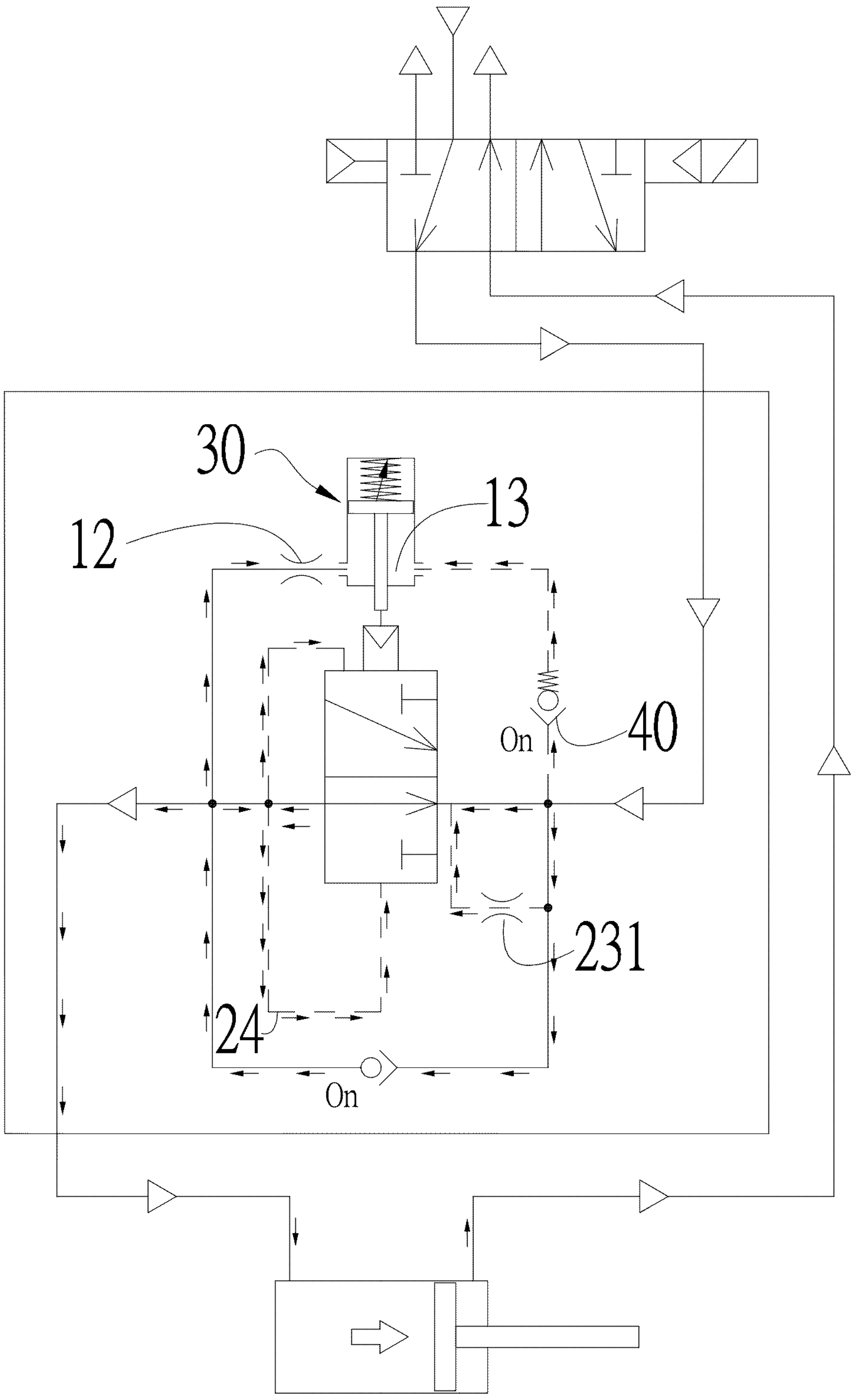
FIG. 8 is a control circuit diagram of the present invention based on FIG. 7.

Referring to FIGS. 5-8, the pressure accumulation chamber (13) is connected with and in communication with a primary throttle channel (12), and the sub-axle (23) is formed with a secondary throttle channel (231) arranged in a transverse direction thereof. When the fluid (A) flows through the first port (15), with the valve (50) being in a closed condition, the fluid (A) is allowed to flow to outside by means of the primary channel (11), the balance channel (24), the secondary channel (40), the primary throttle channel (12), and the secondary throttle channel (231), and in combination with the second port (16), and the pressure of the fluid (A) inside the pressure accumulation chamber (13) drives the sliding axle assembly (20) to move upwards to open the valve (50), and when the fluid (A) continuously passes through the valve (50) in combination with the secondary throttle channel (231) for circulating flow, the sliding axle assembly (20) is continuously kept upward to open the valve (50), allowing a cylinder connected to the main body (10) to be driven to advance at two stages of initial accelerating and a high speed.

Figure 9:
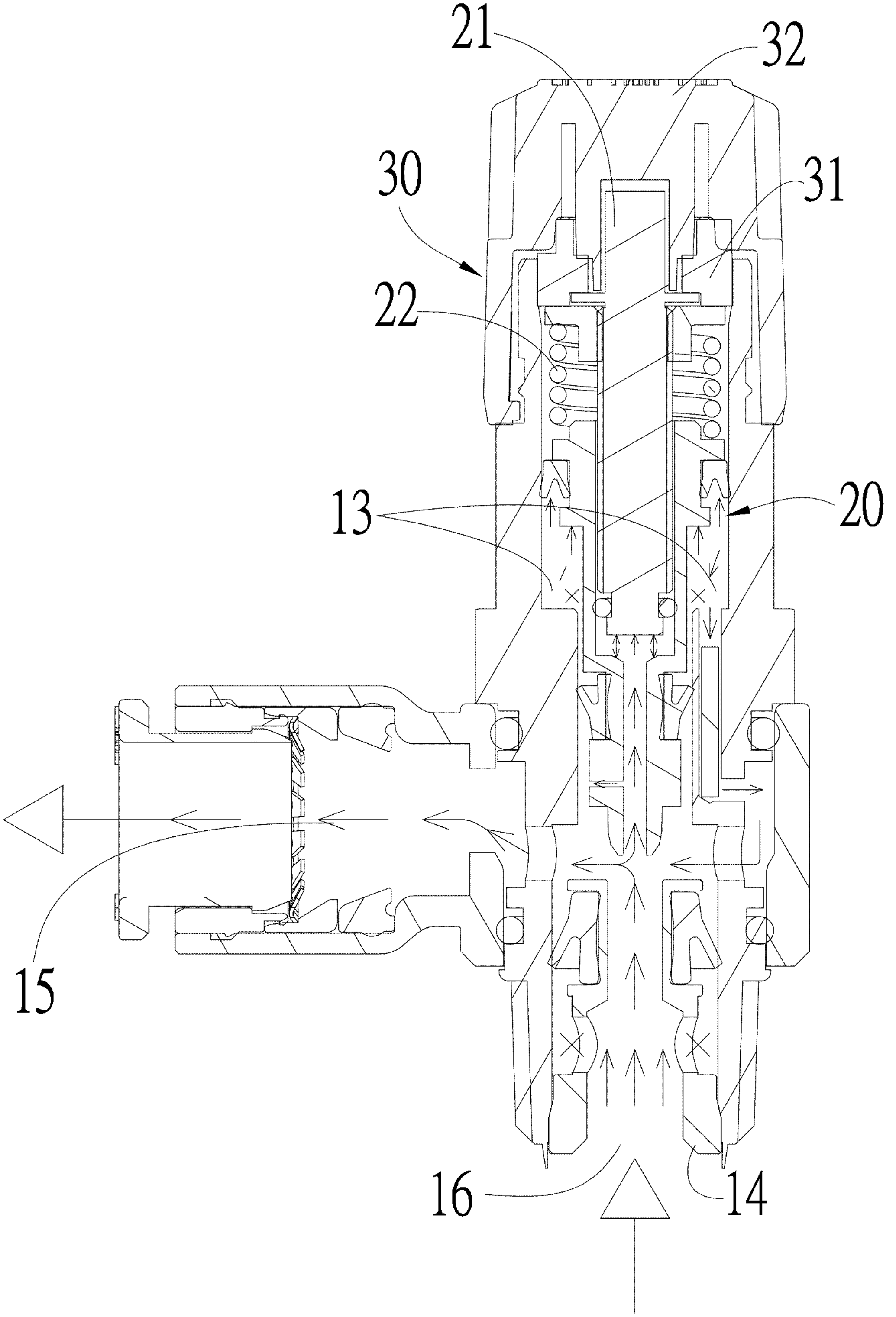
FIG. 9 is a schematic view showing a discharging and high speed state of the main body of the present invention.
Figure 10:
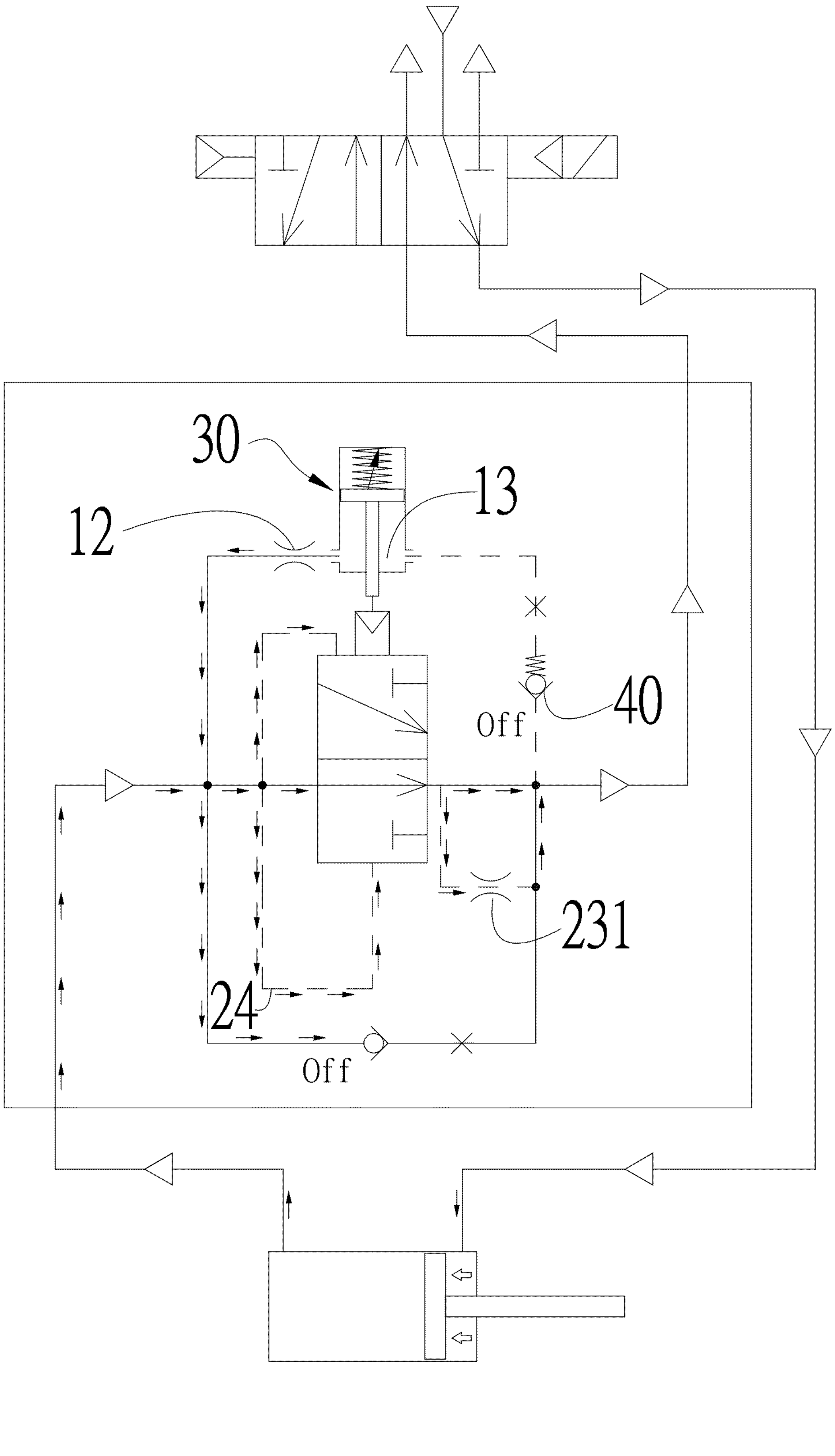
FIG. 10 is a control circuit diagram of the present invention based on FIG. 9.
Figure 11:
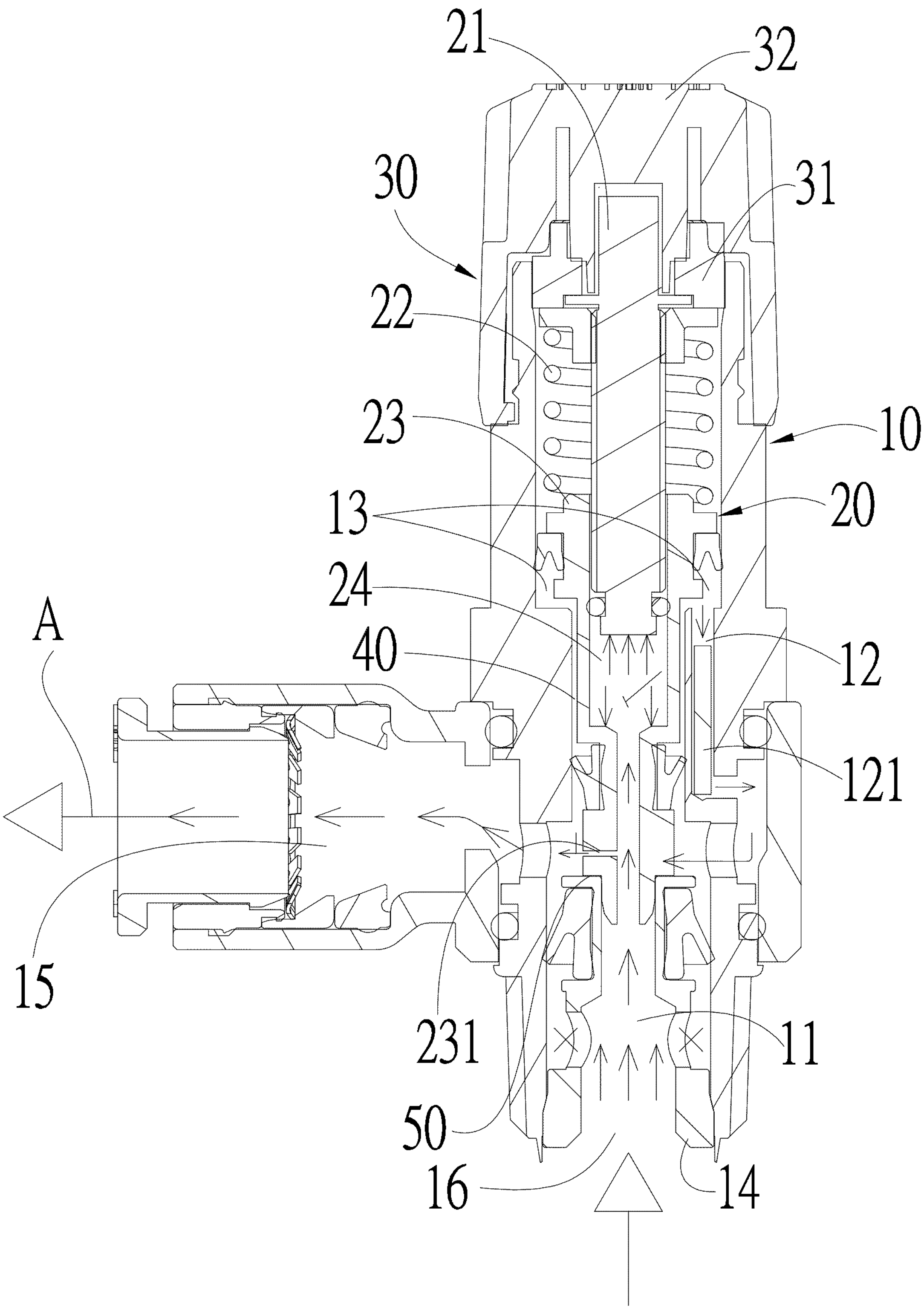
FIG. 11 is a schematic view showing a discharging and slow speed state of the main body of the present invention.
Figure 12:
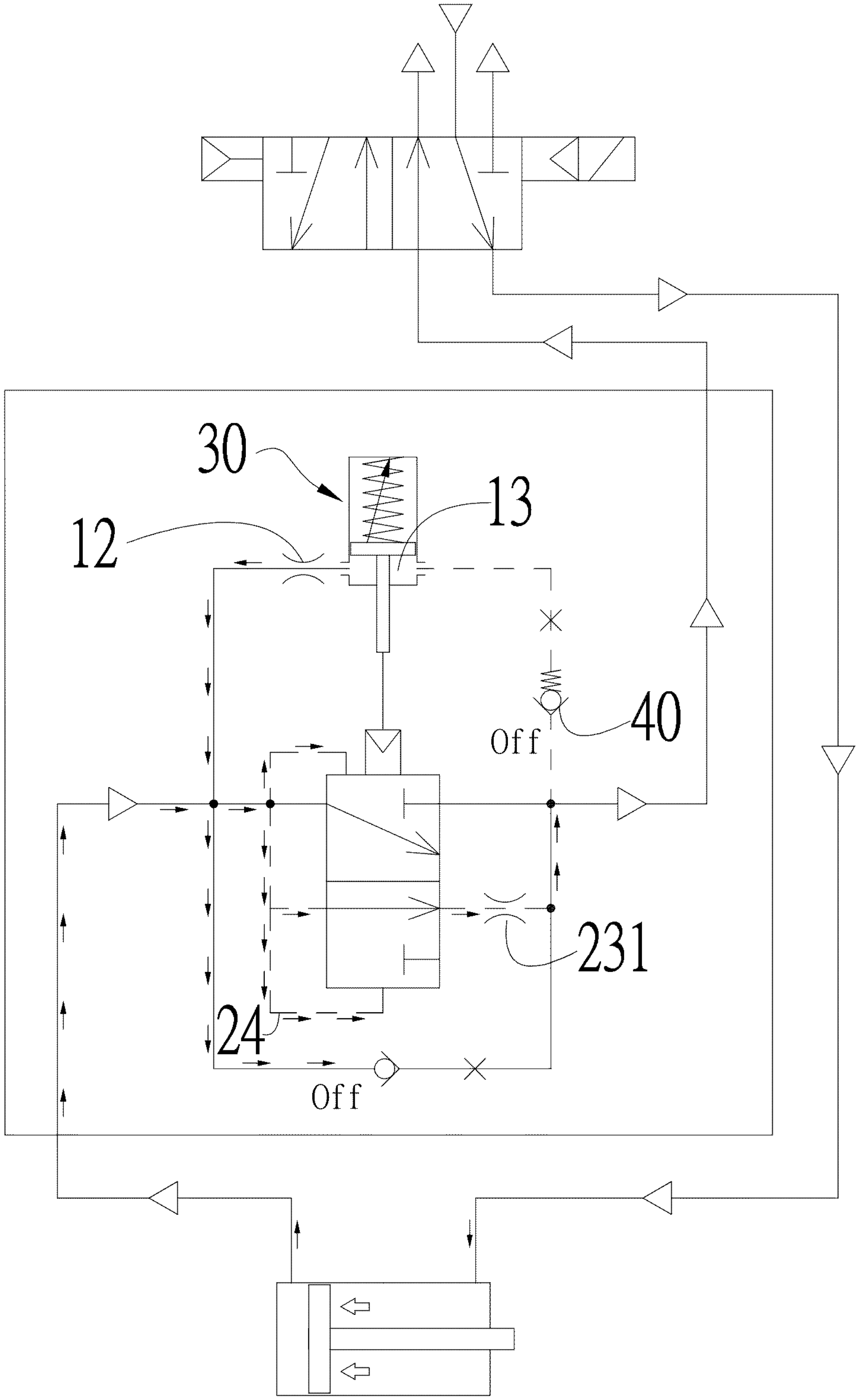
FIG. 12 is a control circuit diagram of the present invention based on FIG. 11.

Referring to FIGS. 9-12, when the valve (50) carries out fast discharging from an ingress condition, the fluid (A) flows through all the previously-mentioned channels to the first port (15) to allow the pressure of the fluid (A) inside the pressure accumulation chamber (13) to drop down and the sliding axle assembly (20) gradually moves downward to close the valve (50), further in combination with the primary throttle channel (12) and the secondary throttle channel (231), to allow the valve (50) to adjust to fully close and cushioning the impact of the back-and-forth motion of the cylinder. A ratio of an area of the valve (50) with respect to an area of the balance channel (24) is between 1:1 and 1:4, primarily for preventing the sliding axle assembly (20) from being pushed backward to cause opening of the valve (50).

When the regulation assembly (30) is in a fast discharging state for the main body (10), the rotary regulation knob (32) in combination with the knob connecting member (31) allows the spring force of the elastic element (22) to adjust positional constraint to the sliding axle assembly (20) for closing the valve (50) so as to allow for adjusting of an internal cushioning position of the cylinder connected to the main body (10).

The primary throttle channel (12) is provided, in an interior thereof, with a throttle cylinder (121), and a cross-sectional area of the primary throttle channel (12) minus a cross-sectional area of the throttle cylinder (121) is between 1% to 7% of an area of the primary throttle channel (12). By setting different cross-sectional areas of the cylindrical throttle pin (231), the pressure lowering of the pressure accumulation chamber (13) can be affected and allowing the sliding axle assembly (20) to close the valve (50) to thereby affect the cushioning position of the cylinder.

The secondary throttle channel (231) has a diameter between 0.2 to 0.4 millimeters. Different diameters can be applied to allow the channel discharging amount to induce a slow-speed motion for cylinder discharging.

In summary, the two-stage speed controller according to the present invention uses the spring force of the elastic element (22) of the sliding axle assembly (20) to handle the pneumatic pressure of the fluid (A), which is achieved, specifically, through an intuitive operation manner by means of the rotary regulation knob (32) to allow the rotary regulation knob (32) to carry out elastic adjustment to therefore control the pressure of the fluid (A) inside the pressure accumulation chamber (13), providing a cylinder connected to the main body (10) with a cushioning effect of two-staged speeds during the operation thereof and to use the arrangement of the primary throttle channel (12) and the secondary throttle channel (231) to influence the pressure drop of the pressure accumulation chamber (13) for further adjustment for carrying out related adjustment of cushioning position and cushioning speed of the cylinder connected to the main body (10) to provide a better effect for cushioning the impact acting on the cylinder.

We claim:

1. A two-stage speed controller, comprising:

a main body, which is formed with a first port and a second port in communication with each other, and a primary channel and a secondary channel for flowing of a fluid, the primary channel allowing fluid to flow from the first port and the second port into the main body, the secondary channel allowing fluid to flow in a single direction to a pressure accumulation chamber, the second port receiving a sliding-axle seat arranged therein;

a sliding axle assembly, which comprises: a main axle having an end penetrating in sequence through an elastic element and a sub-axle to fit to an internal wall of the main body, the main axle and the sub-axle defining therebetween a balance channel, the main axle having an opposite end to which a regulation assembly is mounted, the regulation assembly comprising a knob connecting member connecting a rotary regulation knob, one end of the sliding axle assembly forming, in combination with the sliding-axle seat, a valve, characterized in that the pressure accumulation chamber is connected with and in communication with a primary throttle channel, and the sub-axle is formed with a secondary throttle channel arranged in a transverse direction thereof, wherein when the fluid flows through the first port, with the valve being in a closed condition, the fluid is allowed to flow to outside of the valve by means of the primary channel, the balance channel, the secondary channel, the primary throttle channel, and the secondary throttle channel, and in combination with the second port, driving the sliding axle assembly to start to move upwards to open the valve, and when the fluid is kept continuously circulating and flowing through the valve in combination with the secondary throttle channel, the sliding axle assembly is kept upward opening the valve to allow a cylinder connected to the main body to advance in two stages of speeds of initial acceleration and high speed; when the valve carries out fast discharging from an open condition, the fluid flows, through a combination of all the channels, to the first port to allow the sliding axle assembly to gradually move downward to close the valve, together with the primary throttle channel and the secondary throttle channel, to allow the valve to be adjusted to fully close, allowing for cushioning of impact of a back-and-forth operation of the cylinder.

2. The two-stage speed controller according to claim 1, wherein when the regulation assembly is in a fast discharging state for the main body, the rotary regulation knob in combination with the knob connecting member allows a spring force of the elastic element to adjust positional constraint to the sliding axle assembly for closing the valve so as to allow for adjusting of an internal cushioning position of the cylinder connected to the main body.

3. The two-stage speed controller according to claim 1, wherein the primary throttle channel further comprises: a throttle cylinder, which is arranged in an interior of the primary throttle channel, and a cross-sectional area of the primary throttle channel minus a cross-sectional area of the cylindrical throttle pin is between 1% to 7% of an area of the primary throttle channel, so that different cross-sectional areas of the throttle cylinder influence the pressure drop of the pressure accumulation chamber for closing the valve to thereby influence a cushioning position of the cylinder.

4. The two-stage speed controller according to claim 1, wherein a ratio of an area of the valve relative to an area of the balance channel is between 1:1 to 1:4, primarily for preventing the sliding axle assembly from being pushed backward to cause opening of the valve.

5. The two-stage speed controller according to claim 1, wherein a cross-sectional area of the secondary throttle channel is between 0.2 to 0.4 millimeters, so that different cross-sectional areas are applicable to allow a channel discharging amount to induce a slow-speed motion for cylinder discharging.

* * * * *